(12) United States Patent
Fieldhouse et al.

(10) Patent No.: US 10,953,955 B1
(45) Date of Patent: Mar. 23, 2021

(54) PONTOON-STYLE VESSEL HAVING MOTOR POD PROVIDING EXTREME TURNING RADIUS AND PERFORMANCE HANDLING

(71) Applicant: Brunswick Corporation, Mettawa, IL (US)

(72) Inventors: Bob Fieldhouse, Fort Wayne, IN (US); John O. Wizorek, Fremont, IN (US); Don Mason, Fort Wayne, IN (US)

(73) Assignee: BRUNSWICK CORPORATION, Mettawa, IL (US)

( * ) Notice: Subject to any disclaimer, the term of this patent is extended or adjusted under 35 U.S.C. 154(b) by 312 days.

(21) Appl. No.: 14/562,266

(22) Filed: Dec. 5, 2014

Related U.S. Application Data (63) Continuation of application No. 13/289,496, filed on Nov. 4, 2011, now abandoned.

(60) Provisional application No. 61/410,612, filed on Nov. 5, 2010.

(51) Int. Cl.
  *B63B 1/00* (2006.01)
  *B63B 1/20* (2006.01)

(52) U.S. Cl.
  CPC .......... *B63B 1/20* (2013.01); *B63B 2001/208* (2013.01)

(58) Field of Classification Search
  CPC . B64C 35/00; B63B 35/34; B63B 1/20; B64F 2700/6261; B64F 2700/6265
  USPC ........................................................ 114/292
  See application file for complete search history.

(56) References Cited

U.S. PATENT DOCUMENTS

| 32,547 | A | 4/1900 | Motheral |
| 3,659,546 | A | 5/1972 | Miklos |
| 5,184,561 | A | 2/1993 | Nickell, Jr. |
| 5,259,331 | A | 11/1993 | Hagan |
| 5,522,333 | A * | 6/1996 | Lang ........................ B63B 1/107 114/274 |
| 5,619,944 | A * | 4/1997 | Baker ...................... B63B 1/042 114/283 |
| 5,676,087 | A * | 10/1997 | Baker ....................... B63B 1/20 114/283 |
| 6,016,762 | A | 1/2000 | Price |
| 6,477,969 | B2 | 11/2002 | Schell-Tomczak et al. |
| 6,482,056 | B1 | 11/2002 | Schell-Tomczak et al. |
| 7,004,092 | B2 * | 2/2006 | Yetter ..................... B63B 35/38 114/292 |
| 7,185,599 | B1 | 3/2007 | Griffiths et al. |
| 7,798,088 | B2 | 9/2010 | Hoover et al. |

(Continued)

*Primary Examiner* — Daniel V Venne
(74) *Attorney, Agent, or Firm* — Dale P. DiMaggio; Malin Haley DiMaggio & Bowen, P.A.

(57) ABSTRACT

A vessel having a stern and a bow, a deck having a top surface and a bottom surface; a first outer pontoon, a second outer pontoon, a central pontoon, and the motor pod each disposed below the deck and mounted to the bottom surface of the deck. The central pontoon is disposed between the first outer pontoon and the second outer pontoon, wherein the outer pontoons are spaced apart. The motor pod is disposed behind the central pontoon and between the first outer pontoon and the second outer pontoon. The motor pod defines a running surface, wherein the vessel is capable of planing on the running surface. The motor pod supports a motor at the rear. The vessel provides the ride characteristics and stability of a pontoon-style vessel at rest and at lower speeds while also providing the performance, maneuverability, and turning radius characteristics of a V-hull sport boat.

19 Claims, 6 Drawing Sheets

(56) References Cited

U.S. PATENT DOCUMENTS

| | | | |
|---|---|---|---|
| 7,870,830 B2 | 1/2011 | Bogard et al. | |
| 7,950,340 B1 * | 5/2011 | Curtis | B63B 1/125 |
| | | | 114/61.1 |
| 7,987,803 B2 | 8/2011 | Cochran | |
| 8,186,291 B1 | 5/2012 | Curtis | |
| 8,430,045 B2 * | 4/2013 | Hewitt | B63B 17/00 |
| | | | 114/343 |
| 2002/0023579 A1 * | 2/2002 | Profitt | B63B 1/125 |
| | | | 114/61.12 |
| 2005/0098077 A1 * | 5/2005 | Blaisdell | B63B 1/125 |
| | | | 114/61.22 |
| 2009/0031939 A1 * | 2/2009 | Fishburn | B63B 35/38 |
| | | | 114/292 |

* cited by examiner

PONTOON-STYLE VESSEL HAVING MOTOR POD PROVIDING EXTREME TURNING RADIUS AND PERFORMANCE HANDLING

CROSS REFERENCE TO RELATED APPLICATIONS

This application is a continuation of U.S. application Ser. No. 13/289,496 filed on Nov. 4, 2011, subsequently abandoned, which claims the benefit of U.S. Provisional Application No. 61/410,612 filed Nov. 5, 2010.

STATEMENT REGARDING FEDERALLY SPONSORED RESEARCH OR DEVELOPMENT

N/A

BACKGROUND OF THE INVENTION

1. Field of the Invention

The present invention relates generally to pontoon boats and marine vessels, and more particularly to advanced motor pod, tube and strake designs which enhance operability and maneuverability of pontoon boats.

2. Description of the Prior Art

A pontoon boat is a generally flattish boat that relies on pontoons, i.e. extended tubular members, to provide buoyancy. A traditional pontoon boat includes two pontoons, a left pontoon and a right pontoon, oriented longitudinally and parallel to one another, which the boat deck disposed thereon. The motor of the pontoon boat is typically mounted on the rear of the deck although some designs provide for motor mounts underneath the deck, between the two pontoons. A pontoon boat relies entirely on hydrostatic lift (i.e. buoyancy) while both at rest and in motion, whereas a v-hull planing boat relies on hydrostatic lift at rest and low speeds and hydrodynamic lift during higher operating speeds.

Accordingly, pontoon boats typically provide a more stable and comfortable ride as compared to planing v-hull boats, and therefore are desirable for pleasure boat and other recreational boat designs. However, presently available pontoon boats have significant performance disadvantages as compared to planing boats, particularly with respect to turning radius and high speed maneuverability. Indeed, due to the large pontoons, a pontoon boats turning radius is significantly larger than traditional v-hull planing boats. Moreover, pontoon boats are much less stable when turning or maneuvering at high speeds due to the reliance on hydrostatic lift and the absence of hydrodynamic lift. More recently, modified and improved pontoon boats often are equipped with a center pontoon and lifting stakes that provide more lift and buoyancy. These designs allow higher horsepower engines, increased capacity, and higher speeds, but do not allow for planing and therefore cannot address the maneuverability, turning stability, and turning radius disadvantages of pontoon boats.

Several attempts have been made to improve the design of traditional pontoons, but none have solved the maneuverability and turning problems. For example, U.S. Pat. No. 7,185,599 to Griffiths et al. illustrates a jet drive propulsion system for pontoon boats, in which a removably attachable container or pod is mounted to the underside of the pontoon boat utilizing a plurality of mounts. The pod contains the jet drive motor and the jet nozzle. A forwardly facing step is formed in the bottom surface of the pod. The purpose of the invention in Griffiths is to provide a jet drive propulsion system for a pontoon vessel wherein the drive system is completely contained underneath the deck of the boat, and does not extend above the deck.

U.S. Pat. No. 6,482,056 to Schell-Tomczak et al. describes an adjustable engine mount for a pontoon boat, including an elongated, tapered, four sided unit which is attached to the bottom of the hull in between a pair of spaced apart pontoons. The engine mount is secured to the underside of the boat's deck using mounting rails. The engine mount allows the outboard motor to be adjusted relative to the water line of the boat and therefore provides flexibility for the use of different models of outboard motors.

U.S. Pat. No. 6,477,969 also to Schell-Tomczak et al. illustrates the device described in the '056 patent, however the adjustable motor mount unit is interposed the bottom of the boat hull, and a third pontoon running longitudinally down the center line of the boat. In this case, this center pontoon includes a cylindrical body with a reliever top surface at the rear thereof which receives an angled portion of the motor mount body, in order to partially overlap the pontoon in a vertical profile. The motor mount unit is thereby sandwiched between the bottom side of the boat deck and the relieved rear section of the center pontoon, ostensibly allowing for further vertical adjustment of the motor mount to accommodate various outboard motor designs.

U.S. Pat. No. 6,016,762 to Price illustrates a planing hydrofoil for pontoon boats which is positioned about the center line of the boat, so that the foil is raised toward a planing position on the surface of the water as the boat is propelled. The surface of the hydrofoil is between the waterline and the bottom of the lateral pontoons.

U.S. Pat. No. 7,950,340 to Curtis describes a pontoon boat having a deck, a central pontoon, and two outer pontoons on opposite sides of the central pontoon. The three pontoons extend along the entire length of the pontoon deck and the central pontoon extends below the outer pontoons to create a simulated V-shaped hull. The simulated V-shaped hull is capable of planing provided the motor has enough horsepower with respect to the weight of the boat.

Despite some improvement in traditional pontoon boat design, none of the prior art address improvement of handling and maneuverability, and in particular, the turning radius and turning stability of a pontoon boat during higher operational speeds. Accordingly, there is a need in the art for a pontoon boat that combines the ride and comfort characteristics of a pontoon boat with the maneuverability and turning performance of a v-hull design.

SUMMARY OF THE INVENTION

The invention provides an enhanced pontoon-style vessel design which includes a motor pod that has a tapered, offset, and stepped running surface which provides a planing surface for the vessel. The design provides enough lift to enable the boat to ride on plane on the motor pod running surface at higher speeds, resulting in aggressive maneuvering and handling characteristics similar to that of a fiberglass V-shaped sport boat hull. In some embodiments, the present invention comprises a vessel having a stern and a bow, further comprising a deck having a top surface and a bottom surface; a first outer pontoon, a second outer pontoon, a central pontoon, and a motor pod each disposed below the deck and mounted to the bottom surface of the deck. The central pontoon is disposed between the first outer pontoon and the second outer pontoon, wherein the outer pontoons are spaced apart. The motor pod is disposed behind the central pontoon and between the first outer pontoon and the second outer pontoon. The motor pod defines a running surface, wherein the vessel is capable of planing on the running surface of the motor pod. The motor pod supports a motor at the rear (stern) thereof.

In some embodiments, the central and two outer pontoons are generally tubular in shape and have substantially the same diameter. Further, the outer pontoons may be oriented substantially parallel to one another, and the central pontoon may also be parallel thereto. In some embodiments, the motor pod is centrally aligned behind the central pontoon.

In some embodiments, the central pontoon is configured to be shorter than the first and second outer pontoons and the motor pod extends further rearward than the outer pontoons. Further, the central pontoon and the motor pod extend below the first and second outer pontoons, therefore defining a V-shaped hull configuration in order to provide the benefits of both a pontoon-style boat and a performance v-hull boat.

In some embodiments, the motor pod is tapered such that the front end (toward the bow) is narrower than the rear end (toward the stern) of the motor pod. The running surface of the motor pod is stepped, defining a bi-lateral dead rise angle, such that the vessel, at least while planing, turns about the running surface to the extent of the dead rise angle. The dead rise angle can vary between 1 and 22 degrees, depending on desired performance and handling characteristics. In some embodiments, the running surface comprises a center surface, bi-lateral angled surfaces disposed on either side of the center surface, and bi-lateral tapered surfaces disposed on either side of the bi-lateral angled surfaces. In some embodiments, the angled surfaces each diverge from bow to stern and the tapered surfaces each converge from bow to stern. A fuel cell may be disposed within the motor pod, which helps to increase the buoyancy of the vessel at the stern, providing a more even attitude in the water.

In some embodiments, each of the outer pontoons includes at least one longitudinally disposed lifting strake which is angled downward and inward toward the centerline of the vessel. Likewise, the central pontoon may also include strakes, and in some cases includes one or more sets of bi-lateral strakes to provide lift and stability.

Accordingly, it is an object of the present invention to provide an enhanced pontoon-style vessel that incorporates the benefits of both a pontoon boat and a traditional v-hull sport boat.

It is an object of the present invention to provide a vessel that includes a motor pod disposed between two outer pontoons and behind a central pontoon, which motor pod defines a running surface on which the vessel can plane at higher speeds.

It is another object of the present invention to provide a vessel having a motor pod with a running surface having an appreciable dead rise angle in order for the vessel to have a smaller turning radius than traditional pontoon boats.

It is another object of the present invention to provide a pontoon-style vessel that has the performance and handling characteristics of a V-hull sport boat when running at higher speeds. It is another object of the present invention to provide a pontoon-style vessel that has the ride comfort and stability of a pontoon boat when at rest or running at slower speeds.

These and other objects of the present invention will be apparent and understood upon a thorough review of this disclosure and the attendant drawings.

DETAILED DESCRIPTION OF PREFERRED EMBODIMENTS

Figure 1:
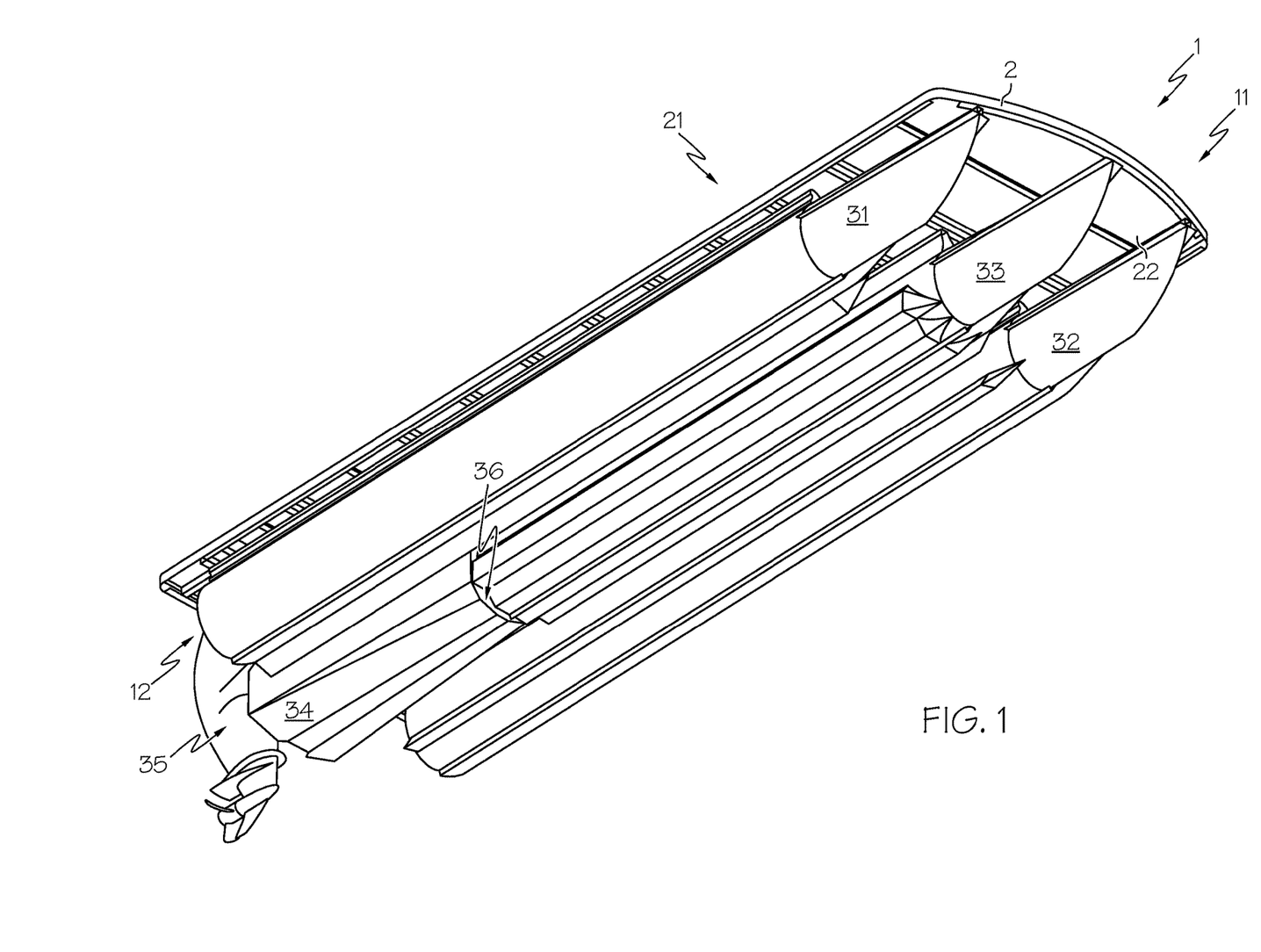
FIG. 1 is a bottom perspective view of one embodiment of the present invention.
Figure 2:
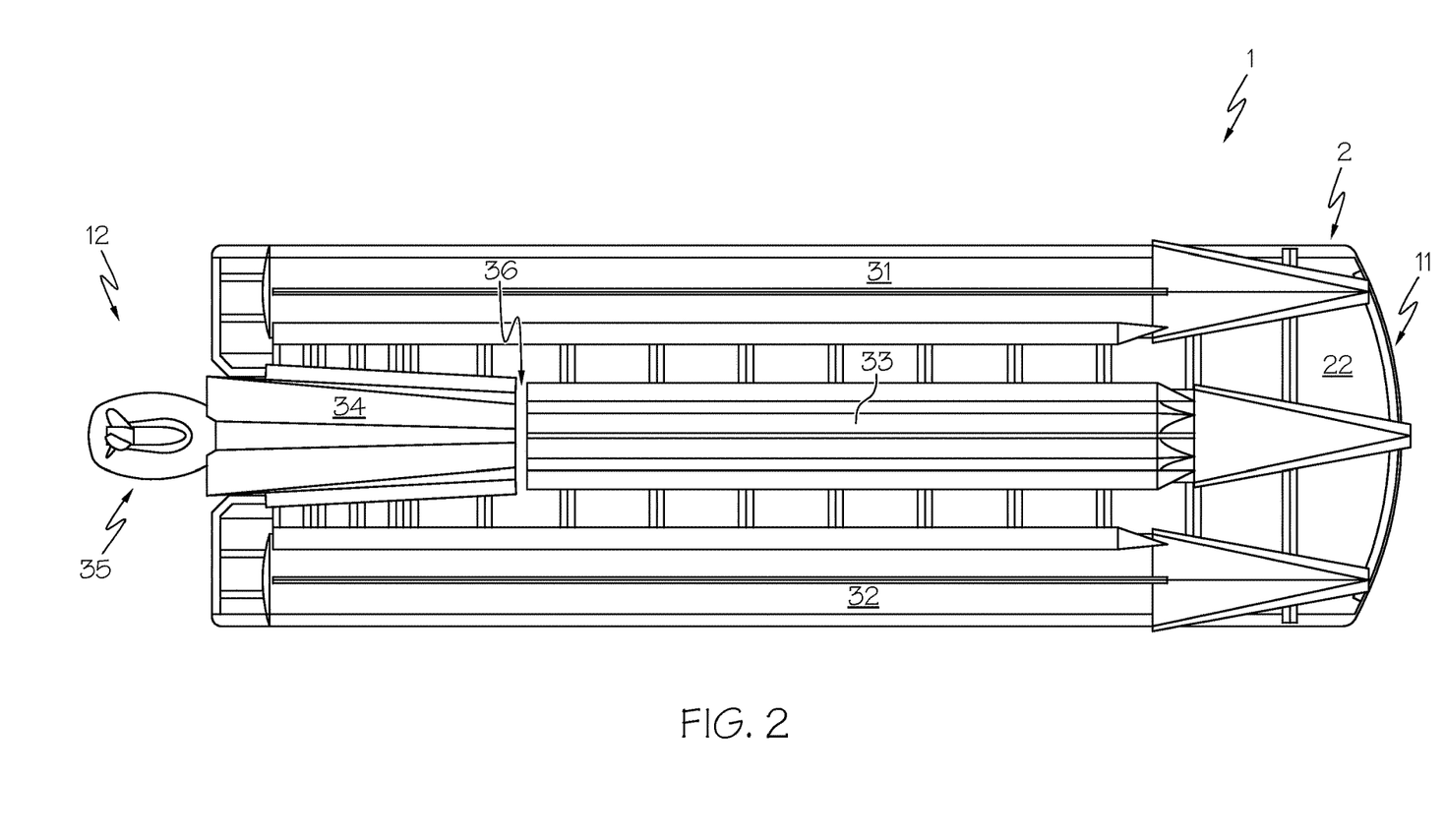
FIG. 2 is a bottom elevation view of one embodiment of the present invention.

With reference to the FIGS. 1 through 7D, the components, assembly and operation of the unique motor pod, tubes, strakes and vessel/boat of the present invention are described. FIG. 1 depicts one embodiment of the pontoon vessel 1 of the present invention. Vessel 1 has a bow 11 and a stern 12 and includes a deck 2 having a top surface 21 and a bottom surface 22. Disposed below deck 2 and mounted to bottom surface 22 are outer pontoons 31 and 32, central pontoon 33, motor pod 34, and motor 35. As shown, in some embodiments, outer pontoons 31 and 32 are generally tubular having a bladed leading end. The outer pontoons are spaced apart and extend substantially along the length of deck 2 of vessel 1, from bow 11 to stern 12, in longitudinal fashion. In some embodiments, the two outer pontoons 31 and 32 are substantially parallel to one another. Central pontoon 33 is disposed between outer pontoons 31 and 32 and extends only partially along the length of deck 2, beginning at the bow 11 and terminating at a point before stern 12. Accordingly, central pontoon 33 is shorter in length than the outer pontoons 31 and 32. In some embodiments, central pontoon 33 is parallel to one or both of the outer pontoons 31 and 32. Motor pod 34 is aft of (i.e. behind) central pontoon 33 and is at least partially disposed between the outer pontoons 31 and 32. In some embodiments, motor pod 34 is centrally aligned with central pontoon 33. Motor pod 34 is not integrated into central pontoon 33, but rather the two structures are separated by gap 36, shown more clearly in FIG. 2. Motor pod 34 therefore is disposed at the stern of vessel 1 and a motor 35 is mounted to the rear end thereof. FIG. 2 depicts the foregoing components as viewed directly from the bottom. As shown, motor pod 34 extends rearward further than the outer pontoons 31 and 32.

Figure 3:
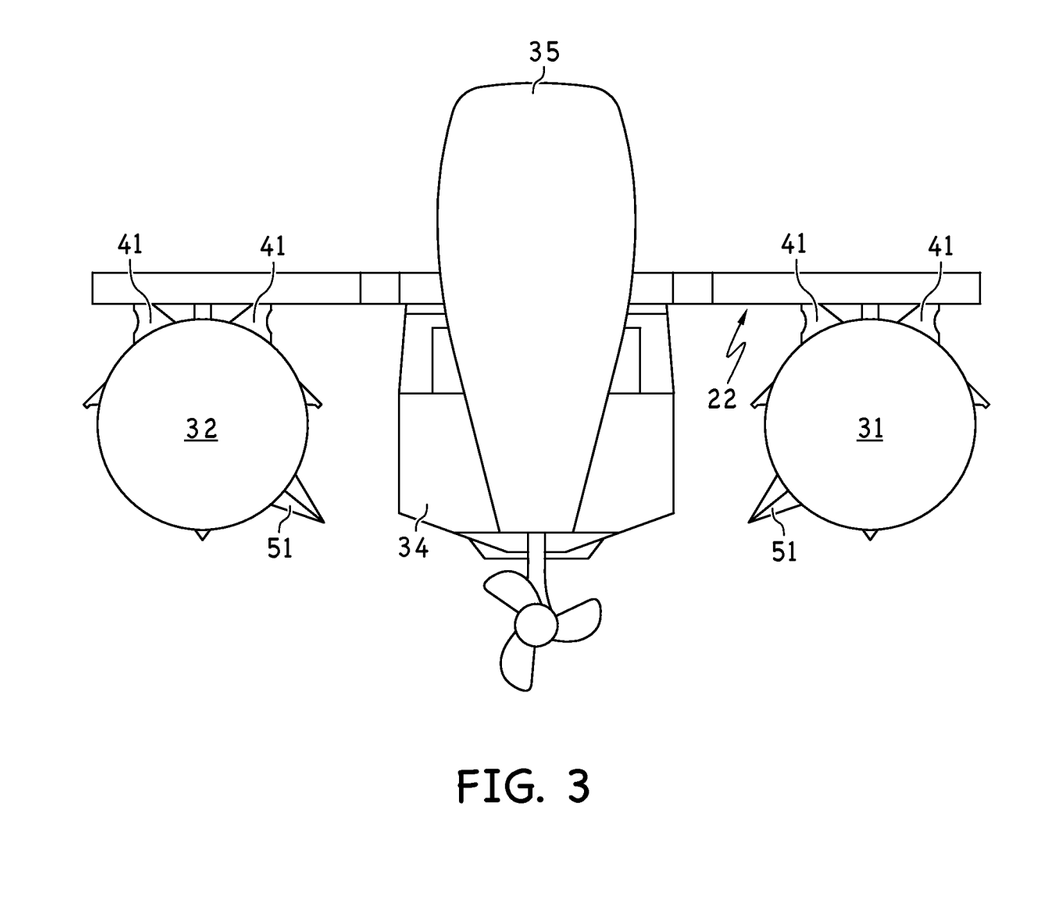
FIG. 3 is a rear elevation view of one embodiment of the present invention.

FIG. 3 is a rear elevation view of the vessel 1 of FIGS. 1 and 2. As shown, outer pontoons 31 and 32 are attached to the bottom surface 22 of deck 2 by one or more outer mounting brackets 41. Longitudinally disposed along the length of each of the outer pontoons 31 and 32 are lifting strakes 51. In some embodiments, strakes 51 are disposed on the lower inside quadrant of each of the outer pontoons 31 and 32 and are angled in a downward and inward direction, towards the centerline of the vessel 1. In some embodiments, the strakes have a triangular or "knife-edge" cross-section, and provide additional surface area for the pontoon, to add lift during operation, increasing maneuverability and fuel economy. Also as shown, outer pontoons 31 and 32 have substantially the same cross-sectional diameter. Motor pod 34 is mounted to the bottom surface 22 of deck 2 as well, and extends below the outer pontoons 31 and 32.

Figure 4:
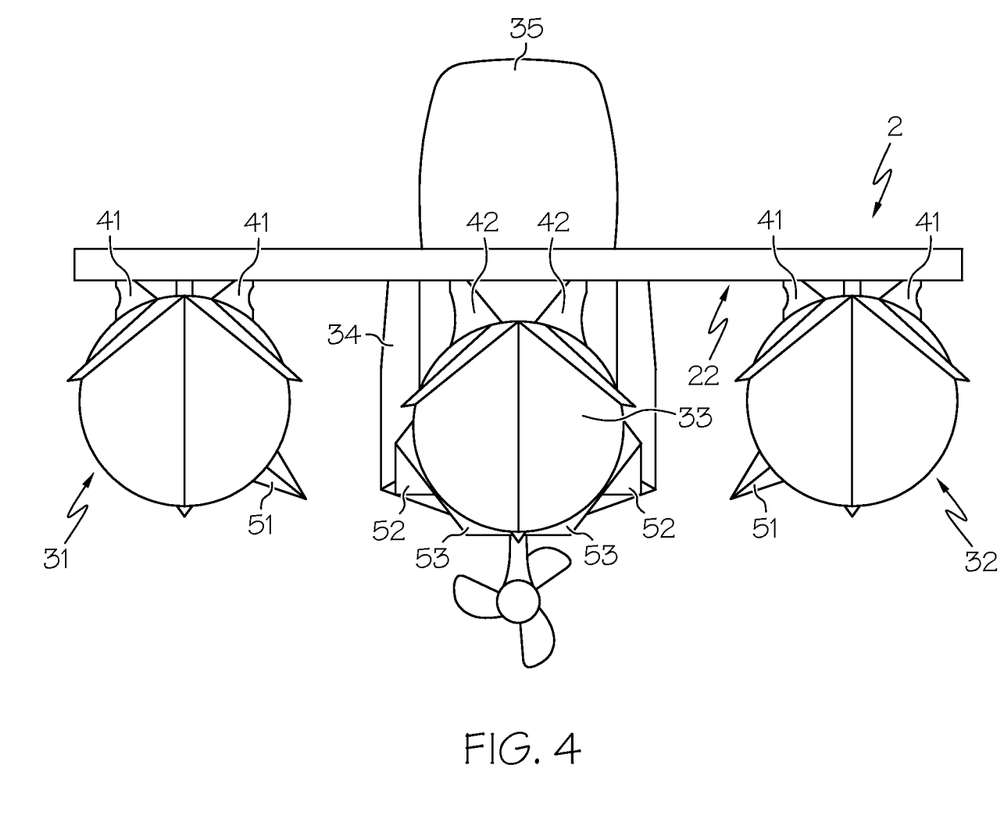
FIG. 4 is a front elevation view of one embodiment of the present invention.

FIG. 4 is a front elevation view of the vessel 1 of FIGS. 1, 2, and 3. Central pontoon 33 is attached to the bottom surface 22 of deck 2 by one or more central mounting brackets 42. In some embodiments, central pontoon 33 may have one or more sets of bi-lateral strakes 52 and 53, which are disposed on the lower half of central pontoon 33, extending longitudinally along the length of the central pontoon 33. Bi-lateral strakes 52 and 53 provide additional lift and stability for vessel 1 during operation.

In some embodiments, central pontoon 33 has the same cross-sectional diameter as outer pontoons 31 and 32. Further, central mounting brackets 42 are longer than outer mounting brackets 41 such that the central pontoon 33 extends below the outer pontoons 31 and 32. This configuration, with motor pod 34 and central pontoon 33 both downwardly offset from and extending below the outer pontoons 31 and 32, creates a true V-hull design that provides the enhanced handling, turning radius, and maneuverability of the vessel of the present invention. It is further appreciated, through examination of FIGS. 3 and 4 together, that at least the rear end of motor pod 34 has a wider cross-section than the diameter of central pontoon 33. This tapered configuration from bow to stern simulates the configuration found on traditional V-hull vessels, and improves overall performance and maneuverability.

Figure 5:
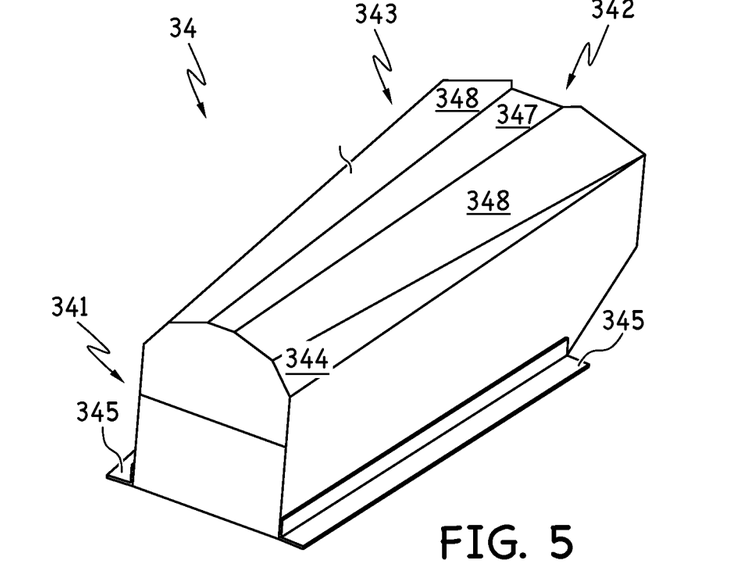
FIG. 5 is a bottom perspective view of one embodiment of the motor pod component of the present invention.

FIG. 5 is a bottom perspective view of motor pod 34. As shown, the bow end 341 of motor pod 34 is narrower than the stern end 342 thereof, such that motor pod 34 is itself tapered. As shown in FIG. 5 and FIG. 7D, motor pod 34 defines a stepped running surface 343 comprising a horizontal center surface 347 Disposed on either side of and spaced apart from the center surface 347 are bi-lateral angled surfaces 348 which, in some embodiments, are trapezoidal in shape. Disposed on either side of the angled surfaces 348 are bi-lateral tapered surfaces 344, which taper from stern to bow. In some embodiments, the bi-lateral angled surfaces 348 diverge, i.e. widen, from bow end 341 to stern end 342 in contrast to bi-lateral tapered surfaces 344 which converge, i.e. narrow, from bow end 341 to stern end 342. It is appreciated and understood by one skilled in the relevant art that the term "running surface" as in running surface 343 means a surface of a marine vessel that is at least partially in contact with the water and on which the vessel is capable of moving by way of either hydrostatic or hydrodynamic forces, i.e. a surface on which the vessel is capable of translating or moving.

The tapering of the bi-lateral tapered surfaces 344 provide pontoon comfort at slower speeds (when the entire running surface 343 is in contact with the water) and performance V-hull performance and higher speeds (when the running surface 343 is on plane, and only the rearmost portion of the running surface 343 is in contact with the water). As a result of this configuration, the motor pod 34 delimits an appreciable bi-lateral dead rise angle D (See FIG. 7B) between the center surface 347 and outer edges of the bi-lateral angled surfaces 348. Motor pod 34 may also have bi-lateral mounting tabs 345, which provide surface area for mounting the motor pod 34 to the bottom surface 22 of deck 2.

Figure 6:
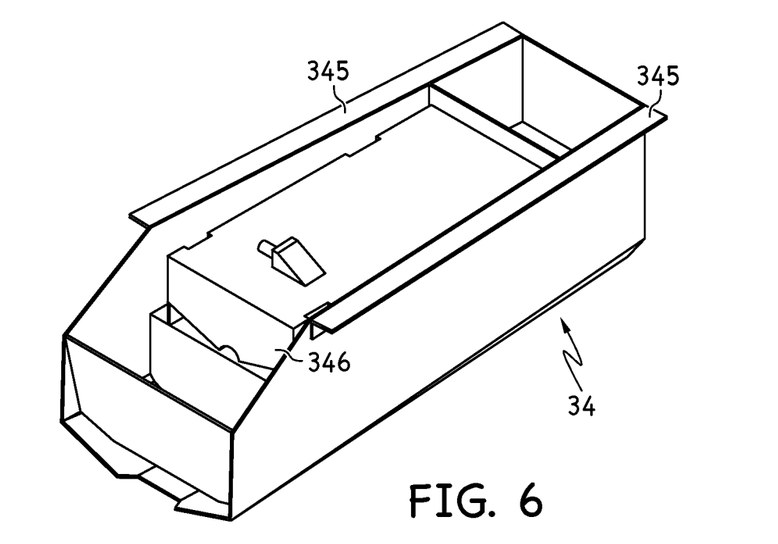
FIG. 6 is a top perspective view of one embodiment of the motor pod component of the present invention.

With reference to FIG. 6, in some embodiments, one or more fuel cells 346 may be disposed on the inside of motor pod 34. This increases the weight, and therefore, buoyancy at the stern of the vessel 1, allowing the vessel 1 to sit at a more level attitude as compared to traditional pontoons boats (even those with a central pontoon), which tend to sit heavy at the stern.

Figures 7A, 7B:
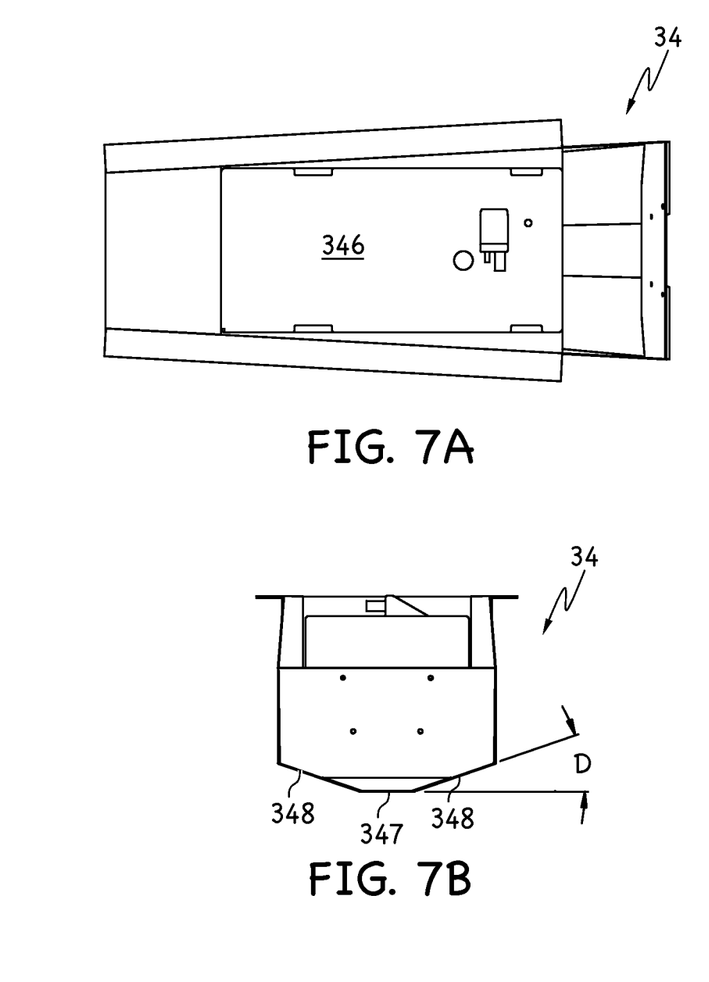
FIG. 7A is a top elevation view of one embodiment of the motor pod component of the present invention.
FIG. 7B is a rear elevation view of one embodiment of the motor pod component of the present invention.
Figures 7C, 7D:
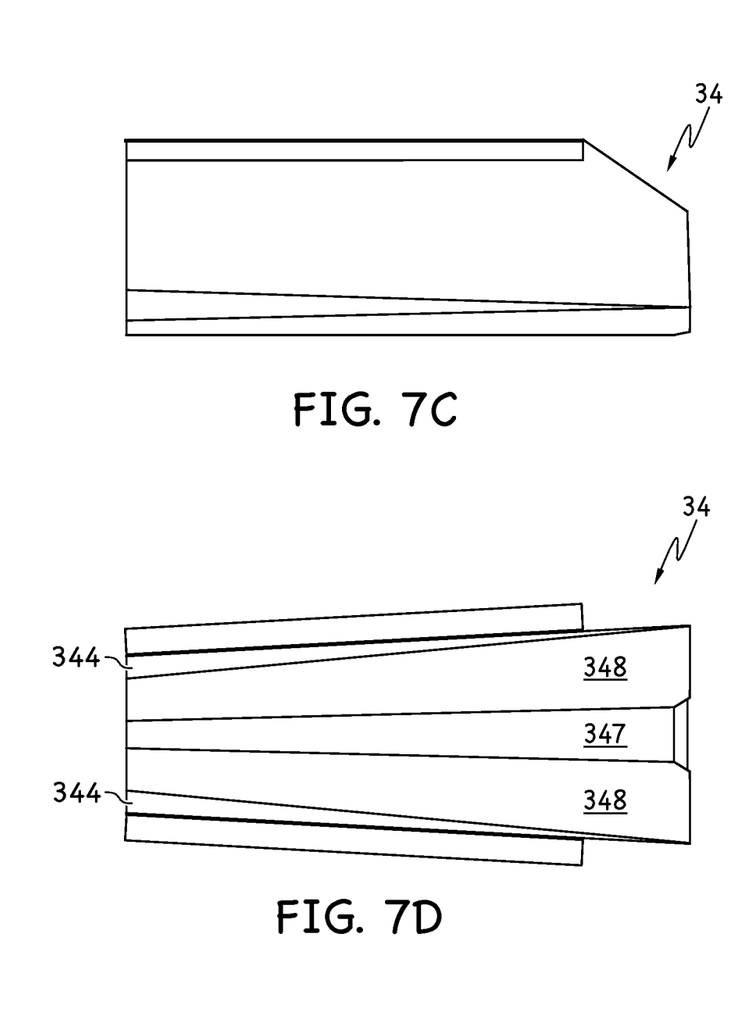
FIG. 7C is a side elevation view of one embodiment of the motor pod component of the present invention.
FIG. 7D is a bottom elevation view of one embodiment of the motor pod component of the present invention.

FIGS. 7A-7D more clearly show the shape and configuration of motor pod 34. Specifically, FIG. 7B shows a rear elevation view of motor pod 34 having a dead rise angle D. It is appreciated that the dead rise angle can vary depending on desired performance and handling characteristics. For instance, a larger dead rise angle will cause vessel 1 to turn more aggressively about motor pod 34, effectively reducing the turning radius of vessel 1.

The configuration of the vessel of the present invention optimizes the characteristics of both pontoon boats and V-hull boats. At rest or at slower, cruising speeds, the vessel 1 will provide the traditionally comfortable and stable ride of a pontoon boat. At rest or these slower speeds, running surface 343 of motor pod 34 is support by hydrostatic lift (i.e. buoyancy), which hydrostatic lift is further increased at the stern of the vessel when a fuel cell 346 is disposed therein. At higher speeds, the vessel is capable of planning on running surface 343 of motor pod 34. To achieve planing, sufficient horsepower is provided by motor 35, which causes running surface 343 of motor pod 34 to feel the effects of hydrodynamic lift. The outer pontoons 31 and 32 and the central pontoon 33 rise at least partially out of the water (if not completely), and the hydrodynamic lift against the running surface 343 of motor pod 34 supports the weight of the vessel 1. Further, during high speed turning and maneuvering, vessel 1 will tilt about the dead rise of the running surface 343 of motor pod 34, significantly improving handling stability and decreasing the turning radius as compared to traditional pontoon boats. The configuration of the motor pod herein can provide an extremely narrow turning radius in comparison to traditional pontoon boats.

Although the present invention is not limited to certain sizes, shapes, and dimensions, it is helpful to consider some examples with respect to certain characteristics. In some embodiments, the motor pod 34 is at least 84" in length, which provides an optimally sized running surface 343 for planing at high speeds. Further, as noted above, the tapering of the central pontoon into the motor pod 34 is desired in order for the vessel to perform as expected during slower, cursing speeds. Accordingly, in some embodiments, the central pontoon 33 has a nominal diameter of 25" and the rear most portion of running surface 343 of motor pod 34 has a width of 32". This tapering reduces drag and increases maximum speed and fuel economy as compared to traditional pontoon vessels.

Furthermore, in some cases, brackets 41 and 42 may be dimensioned such that the central pontoon 33 extends at least 3 inches below the outer pontoons 31 and 32. Similarly, with reference back to FIG. 3, motor pod 34 is also downwardly offset from outer pontoons 31 and 32 by at least 3 inches. This provides vessel 1 with a true "V hull" design and provides for optimal stability during aggressive, high-speed turns, preventing the vessel from leaning too far to either side. Zero or very small offset will decrease the vessel's ability to turn, particularly at higher speeds, since the vessel will not have an ideal and true V-hull profile.

As noted above, the dead rise angle D of motor pod 34 can vary depending on desired handling characteristics. However, in some cases a 19 degree dead rise angle allows the boat to turn with optimal aggressiveness and stability. A 19 degree dead rise in this instance, is very similar to the dead rise found on traditional V-hull sport boats. That being said, the dead rise angle D could vary from 1 degree to 22 degrees, depending on the desired performance and handling characteristics. The running surface 343 may have bi-lateral tapered surfaces 344 with a maximum width of 12", i.e. tapering from 12" width at the rear to zero at the front of the motor pod 34. This again provides optimal performance and maneuverability at high speeds while providing the comfort of a pontoon boat at rest or during slower, cruising speeds. Finally, in some embodiments, the motor pod 34 extends rearward beyond the outer pontoons 31 and 32 by at least 15 inches. This allows the running surface 343 of motor pod 34 to produce a real, usable wake for recreational and other purposes. In some cases, the wake created from this design may exceed 21", depending on the speed of vessel 1.

It is appreciated, however, that the foregoing noted dimensions are merely useful examples and shall not be considered limiting as the dimensions may vary depending on the overall size of the vessel 1, and the desired handling and maneuverability characteristics of same. Accordingly, the relative dimensions of the components of vessel 1 can vary without departing from the scope and spirit of the present invention. Thus, the instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A vessel having a stern and a bow, said vessel comprising:
   a deck having a top surface and a bottom surface;
   a first outer pontoon, a second outer pontoon, a central pontoon, and a motor pod each disposed below said deck and mounted to said bottom surface;
   said central pontoon disposed between said first outer pontoon and said second outer pontoon and extending from said bow of said vessel rearward to said motor pod;
   said motor pod disposed behind said central pontoon and between said first outer pontoon and said second outer pontoon;
   said motor pod comprising a horizontal center surface and bi-lateral angled surfaces disposed on either side of said horizontal center section;
   said bi-lateral angled surfaces each diverge from a bow end to a stern end of said motor pod;
   said motor pod further comprises bi-lateral tapered surfaces disposed on either side of said bi-lateral angled surfaces; and
   wherein said vessel will plane on said motor pod.

2. The vessel of claim 1, wherein said central pontoon is shorter than said first and second outer pontoons.

3. The vessel of claim 1, wherein said motor pod extends further rearward than said first and second outer pontoons.

4. The vessel of claim 1, wherein said central pontoon and said motor pod extend below said first and second outer pontoons, defining a V-shaped hull configuration.

5. The vessel of claim 1, wherein a front end of said motor pod is narrower than a rear end of said motor pod.

6. The vessel of claim 1, wherein said motor pod has a bi-lateral dead rise angle.

7. The vessel of claim 6, wherein said bi-lateral dead rise angle is between 1 and 22 degrees.

8. The vessel of claim 6, wherein said bi-lateral dead rise angle is 19 degrees.

9. The vessel of claim 1, wherein said bi-lateral tapered surfaces each converge from a bow end to a stern end of said motor pod.

10. The vessel of claim 1, wherein each of said outer pontoons includes at least one longitudinally disposed lifting strake.

11. The vessel of claim 10, wherein said lifting strake is angled downward and inward toward a centerline of said vessel.

12. The vessel of claim 1, wherein said central pontoon includes at least one set of bi-lateral longitudinally disposed strakes.

13. The vessel of claim 1, wherein one or more fuel cells are disposed in said motor pod, increasing the buoyancy of said vessel at said stern.

14. The vessel of claim 1, wherein said motor pod supports a motor, said motor capable of causing said vessel to plane on said motor pod.

15. A vessel having a stern and a bow, said vessel comprising:
   a deck having a top surface and a bottom surface;
   a first outer tubular pontoon, a second outer tubular pontoon, a central tubular pontoon, and a tapered and stepped motor pod each disposed below said deck and mounted to said bottom surface;
   said first, second, and central pontoons each having a diameter equal to one another;
   said first and second outer pontoons spaced apart and parallel to one another;
   said central pontoon disposed between said first outer pontoon and said second outer pontoon and parallel to said first and second outer pontoons and extending from said bow of said vessel rearward to said motor-pod;
   said motor pod disposed behind and centrally aligned with said central pontoon and further disposed between said first outer pontoon and said second outer pontoon;
   said motor pod comprising a horizontal center surface and bi-lateral angled surfaces disposed on either side of said horizontal center section;
   said motor pod further comprises bi-lateral tapered surfaces disposed on either side of said bi-lateral angled surfaces; and
   wherein said vessel is capable of planing on said motor pod.

16. The vessel of claim 15, wherein said central pontoon is shorter than said first and second outer pontoons.

17. The vessel of claim 15, wherein said motor pod extends further rearward than said first and second outer pontoons.

18. The vessel of claim 15, wherein said central pontoon and said motor pod extend below said first and second outer pontoons, defining a V-shaped hull configuration.

19. The vessel of claim 15, wherein said motor pod has a bi-lateral dead rise angle, said vessel tilting about said motor pod while turning on plane.

* * * * *